United States Patent
Rahamim et al.

(10) Patent No.: US 9,667,533 B2
(45) Date of Patent: May 30, 2017

(54) CREATING AND UTILIZING CUSTOMIZED NETWORK APPLICATIONS

(71) Applicant: Freescale Semiconductor, Inc., Austin, TX (US)

(72) Inventors: Hezi Rahamim, Ramat Gan (IL); Gal Biran, Kfar-Saba (IL)

(73) Assignee: NXP USA, Inc., Austin, TX (US)

( * ) Notice: Subject to any disclaimer, the term of this patent is extended or adjusted under 35 U.S.C. 154(b) by 75 days.

(21) Appl. No.: 14/856,970

(22) Filed: Sep. 17, 2015

(65) Prior Publication Data

US 2017/0085470 A1    Mar. 23, 2017

(51) Int. Cl.
*G06F 15/16*    (2006.01)
*H04L 12/725*    (2013.01)
(Continued)

(52) U.S. Cl.
CPC .......... *H04L 45/306* (2013.01); *H04L 45/745* (2013.01); *H04L 69/22* (2013.01); *G06F 9/5072* (2013.01)

(58) Field of Classification Search
CPC ..... H04L 46/306; H04L 46/745; H04L 69/22; H04L 69/32; H04L 12/5693; H04L 47/28; H04L 47/522; H04L 47/10; H04L 47/30; H04L 49/90; H04L 67/34; H04L 29/06; H04L 47/6255; G06F 9/5072; G06F 2209/549
(Continued)

(56) References Cited

U.S. PATENT DOCUMENTS 6,189,138 B1    2/2001    Fowlow et al.
6,687,220 B1 *  2/2004    Ayres ................. H04L 12/5693
                                                                370/229
(Continued)

FOREIGN PATENT DOCUMENTS

WO    9966680    12/1999

OTHER PUBLICATIONS

"Polis: A Framework for Hardware-Software Co-Design of Embedded Systems," University of California, Berkeley, CA, 1999, 6 pages.
(Continued)

*Primary Examiner* — Afsar M Qureshi (57) ABSTRACT

This disclosure describes a network flow framework that generates customized network applications based upon user inputs that invokes various software building block functions to process ingress data packets. The network flow framework creates a network application pointer that points to the customized network application, and stores the network application pointer with application classification keys in a classification entry. When the network flow framework receives an ingress data packet, the network flow framework matches the ingress packet's classification key to the application classification key in the classification entry. As such, the network flow framework retrieves the network application pointer from the classification entry and stores the network application pointer in the ingress data packet's header. In turn, the network flow framework retrieves the customized network application corresponding to the network application pointer and processes the ingress data packet accordingly.

20 Claims, 11 Drawing Sheets

(51) Int. Cl.
*H04L 12/741* (2013.01)
*H04L 29/06* (2006.01)
*G06F 9/50* (2006.01)

(58) Field of Classification Search
USPC .......................... 370/392; 709/203, 230, 227
See application file for complete search history.

(56) References Cited

U.S. PATENT DOCUMENTS

| | | | | |
|---|---|---|---|---|
| 6,738,371 | B1* | 5/2004 | Ayres | H04L 12/5693 370/352 |
| 7,092,941 | B1* | 8/2006 | Campos | G06F 17/30539 707/737 |
| 7,191,240 | B1* | 3/2007 | Johnson | H04L 69/32 709/203 |
| 2002/0178264 | A1* | 11/2002 | Benda | G06F 9/5072 709/227 |
| 2008/0049619 | A1* | 2/2008 | Twiss | H04L 45/04 370/236 |
| 2011/0282815 | A1* | 11/2011 | Thomas | G06N 5/025 706/12 |
| 2014/0003445 | A1* | 1/2014 | Lee | H04L 47/803 370/412 |
| 2014/0143441 | A1* | 5/2014 | Seo | H04L 45/00 709/238 |
| 2014/0237456 | A1* | 8/2014 | Monclus | G06F 8/41 717/140 |

OTHER PUBLICATIONS

"Esterel," Wikipedia.com, Jul. 2015, 5 pages.
Gregc, "Freescale Processor Expert (Driver and RTOS tool for the Kinetis Freedom Boards)," Premier Farnell PLC., Sep. 2012, 11 pages.

* cited by examiner

Customized Network
Application X 125

```
.
.
.
struct                                    ← 600
table_search_command{    ← 610
    uint32_t opcode;
    uint16_t table_id;
    uint8_t key_type;
    uint8_t key_size;
    void *lookup_result;
    int32_t status_addr;    ← 615
    bool param_location;
};
.
.
                                          ← 620
struct aiop_if_command {
    uint32_t opcode;
    uint32_t compared_size;    ← 625
    int64_t compared_value;
    uint16_t
    compared_variable_addr;
    uint16_t true_cmd_offset;    ← 630
    uint8_t cond;
};
.
.
```

CREATING AND UTILIZING CUSTOMIZED NETWORK APPLICATIONS

TECHNICAL FIELD

The present disclosure relates to creating customized network applications and utilizing the customized network applications to process individual packets in a network.

BACKGROUND

Network infrastructures, such as computer networks, cellular networks, etc., play a critical role in today's digital age. Network infrastructures utilize network applications that monitor, manage, and manipulate ingress and egress network traffic. Typical jobs performed by network applications to route packets through a network include table lookups, parsing a packet, statistical gathering, packet header and data modification, checksum calculation and validation, packet forwarding/drop, security, traffic policing, and traffic shaping.

Each network application is usually inflexible and written in dedicated software code for implementation on a specific machine, which requires a software developer to possess a deep understanding of the machine architecture. Unfortunately, the increasing demand for high network bandwidth and adaptable connectivity results in network applications that are tremendously complex to meet strict performance requirements for a particular network.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

A network flow framework receives user inputs and generates customized network applications based upon predefined building block functions. The customized network applications consist of programming structures, which include input/output parameters and opcodes that call the various building block functions.

The network flow framework stores the customized network applications at memory locations and creates network application pointers that point to the memory locations. In turn, the network flow framework stores the network application pointers, along with corresponding application classification keys, into classification entries. In one embodiment, the application classification keys are generated from user provided parameters such as MAC addresses or IP addresses for which a particular customized network application should be utilized.

As the network flow framework receives an ingress data packet, the network flow framework matches a packet's packet classification key to one of the application classification keys. When a match is found, the network flow framework retrieves the network application pointer from the classification entry that has the matched application classification key, and stores the network application pointer into the ingress data packet's header. As such, the ingress data packet is processed independent from other ingress data packets.

The network flow framework uses the network application pointer to locate the appropriate customized network application and load the customized network application into a runtime environment. In turn, the customized network application executes, which calls the various building block functions to process the ingress data packet.

Figure 1:
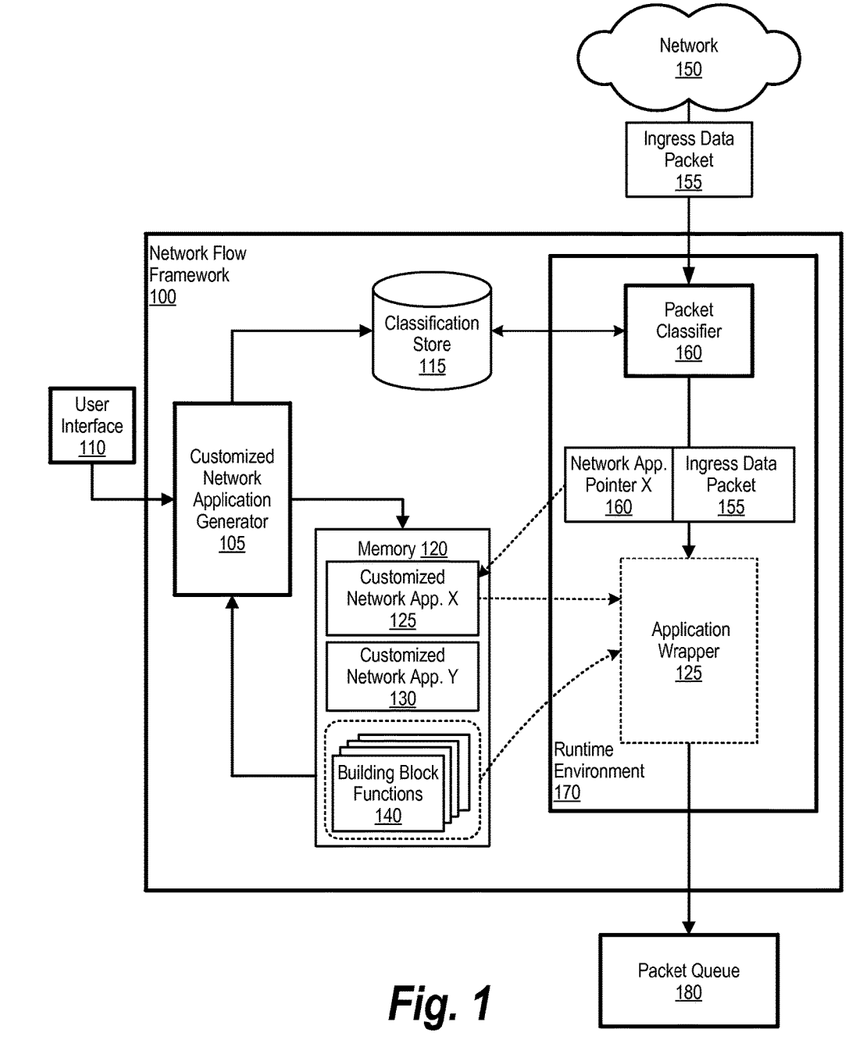
FIG. 1 is a diagram depicting one example of a network flow framework that creates customized network applications and utilizes the customized network applications to process ingress data packets.

FIG. 1 is a diagram depicting one example of a network flow framework that creates customized network applications and utilizes the customized network applications to process ingress data packets. Network flow framework 100 may be, for example, a hardware based computer system, a software based computer system, or a hardware/software based computer system.

Figure 3:
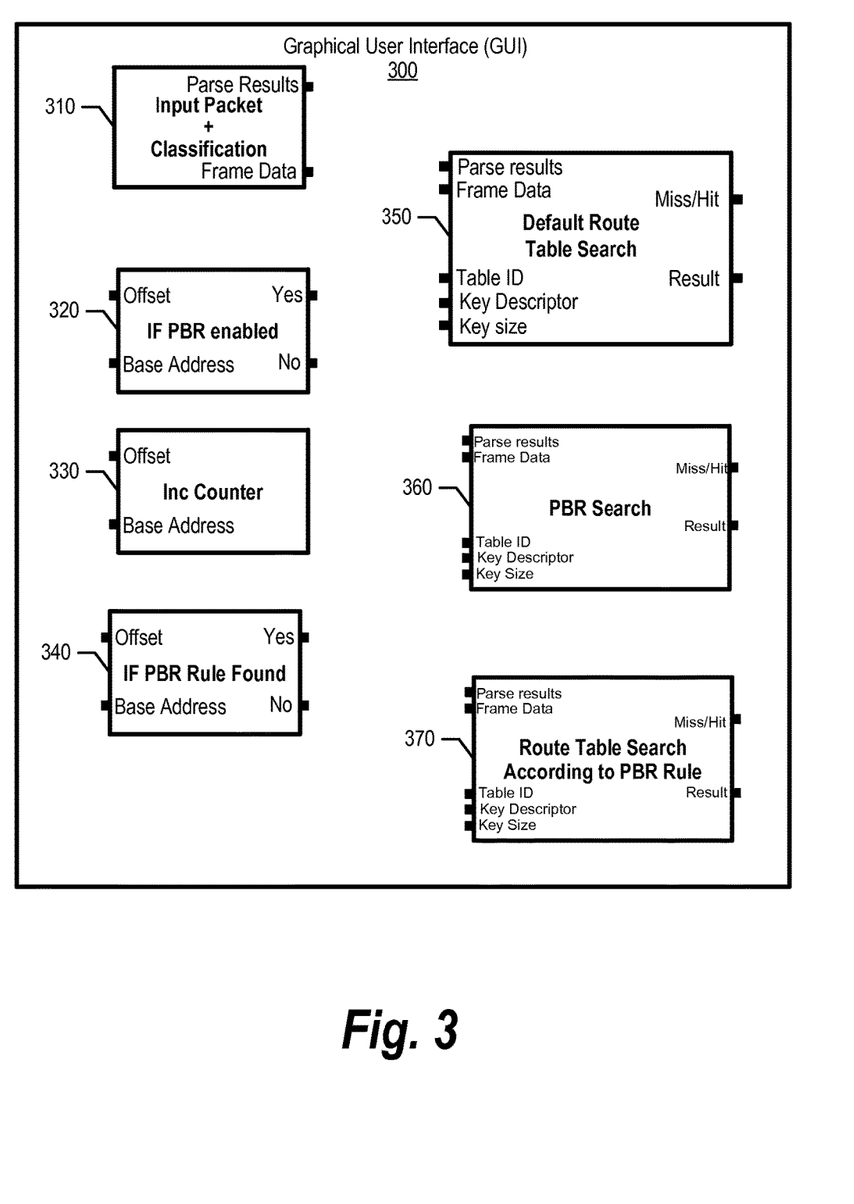
FIG. 3 is a diagram depicting one example of a graphical user interface that shows building block functions for which to create a network application.

Network flow framework 100 includes customized network application generator 105, which receives user input through user interface 110 to create a customized network application based upon application building block functions 140. Building block functions 140 correspond to standalone functions that process an ingress data packet in a network environment, such as table search functions, policy based routing (PBR) functions, etc. FIG. 3 shows a few examples of images that represent building block functions 140.

Figure 4:
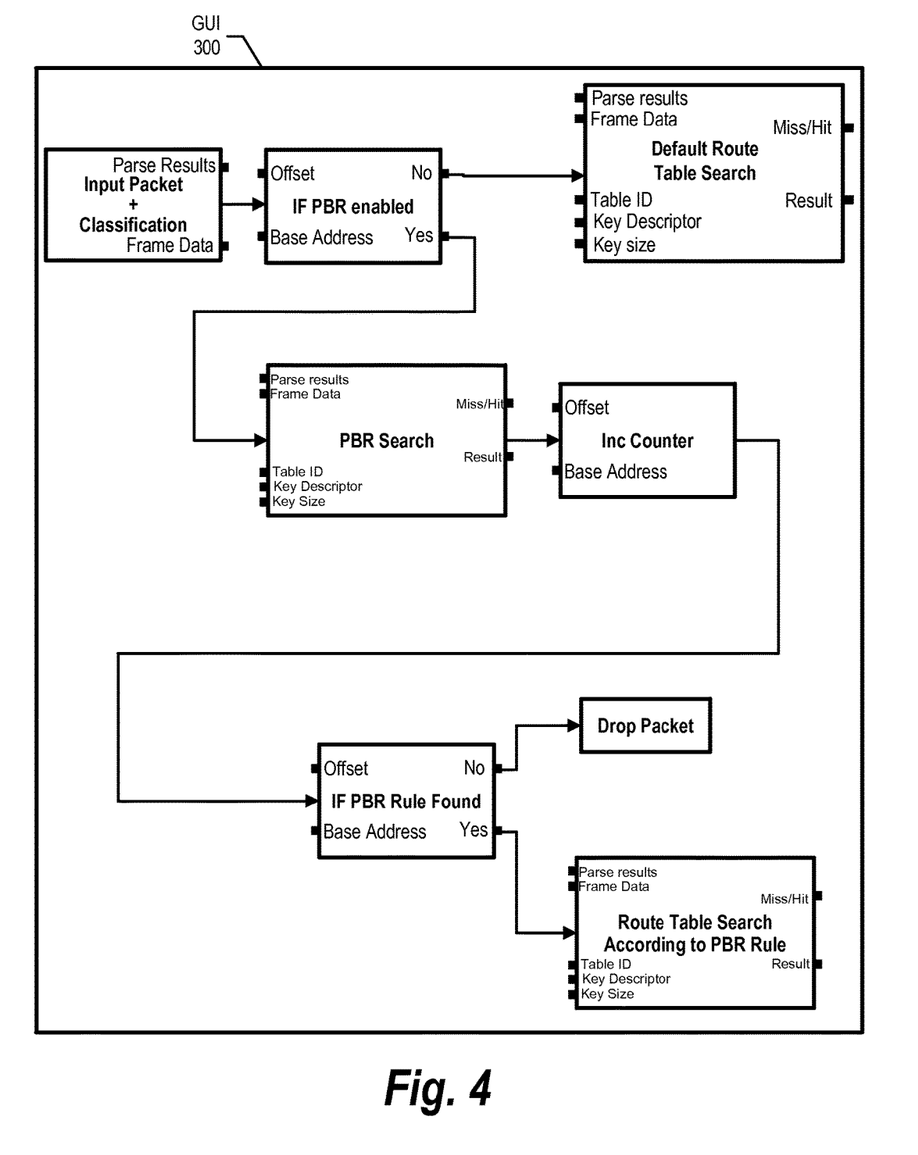
FIG. 4 is a diagram depicting one example of a user using a GUI to link building block functions and create a customized network application.

In one embodiment, a user may graphically link building block functions 140 using a graphical user interface, such as that shown in FIGS. 3 and 4. In another embodiment, the user provides pseudo-code that corresponds to an order in which building block functions 140 should be invoked, such as that shown in FIG. 5. In yet another embodiment, the user may provide building block function connection information such as constant values or connections to different block outputs that customized network application generator 105 utilizes to create a customized network application.

Customized network application generator 105 creates customized network applications, such as customized network application X 125 and customized network application y 130, based upon the user input and stores the customized network applications in memory 120 at particular memory locations. In one embodiment, the customized network applications include programming structures, such as C structures, for each building block function. The programming structures include input/output parameter values for their corresponding building block functions and an opcode to call the corresponding building block function. See FIG. 6 and corresponding text for further details regarding a customized network application.

Customized network application generator 105 also receives application classification parameters from the user, such as source/destination MAC addresses, VLAN ID's, etc. Customized network application generator 105 generates an application classification key based on the application classification parameters and stores the application classification key with a network application pointer, which points to the customized network application, in a classification entry in classification store 115. In one embodiment, customized network application generator 105 concatenates the classification parameters to form the application classification key. See FIG. 7 and corresponding text for further details.

During runtime, when network flow framework 100 receives ingress data packet 155 over network 150, packet classifier 160 generates a packet classification key from ingress data packet 155's classification parameters, such as by concatenating source/destination MAC addresses or IP addresses in ingress data packet 155's header. Packet classifier 160 compares the packet classification key against the application classification keys in classification store 115. When packet classifier 160 locates a matching application classification key, packet classifier 160 retrieves the corresponding network application pointer from the matching classification entry and stores the network application pointer into the header of ingress data packet 155, shown as network application pointer 160 FIG. 1.

Runtime environment 170 analyzes the network application pointer and loads the particular customized network application located at the pointer location into application wrapper 125. In one embodiment, application wrapper 125 is a while loop that includes switch case code that loads the C structures from the customized network application and calls the corresponding building block functions 140 until customized network application completes. For example, application wrapper 125 may be in the form of:

While (next_command !=NULL)
{
  Switch(next_command.opcode)
  {
    Case block_a:
    . . .
    Break;
    Case block_a:
    . . .
    Break;
    . . .
  }
  Load next_command;
}

FIG. 1 shows that network application pointer X 160 points to customized network application X 125, which runtime environment 170 loads. While customized network application X 125 executes, routing results are produced that customized network application X 125 may store in ingress data packet 155's header for subsequent use. For example, when a routing table search building block function finds an entry match, customized network application X 125 may store the results in the header for subsequent processing. In turn, customized network application X 125 queues the packet in packet queue 180 or drops the packet based upon the routing results. For example, if customized network application X 125 does not locate a matching table entry, customized network application X 125 drops the packet.

In one embodiment, customized network application 175 may pass information between building block functions using, for example, a task local storage (TLS). In this embodiment, a first building block function may store parameter information into the TLS, and a second building block function may retrieve the parameter information from the TLS. See FIG. 6 and corresponding text for further details.

In another embodiment, runtime environment 170 concurrently executes different ingress data packets using different customized network applications. For example, runtime environment 170 may receive a different ingress data packet corresponding to customized network application Y 130 while runtime environment 170 processes ingress data packet 155. In this embodiment, runtime environment 170 initiates a different application wrapper that loads customized network application Y 130 and concurrently processes the different ingress data packet while application wrapper 125 processes ingress data packet 155.

Figure 2:
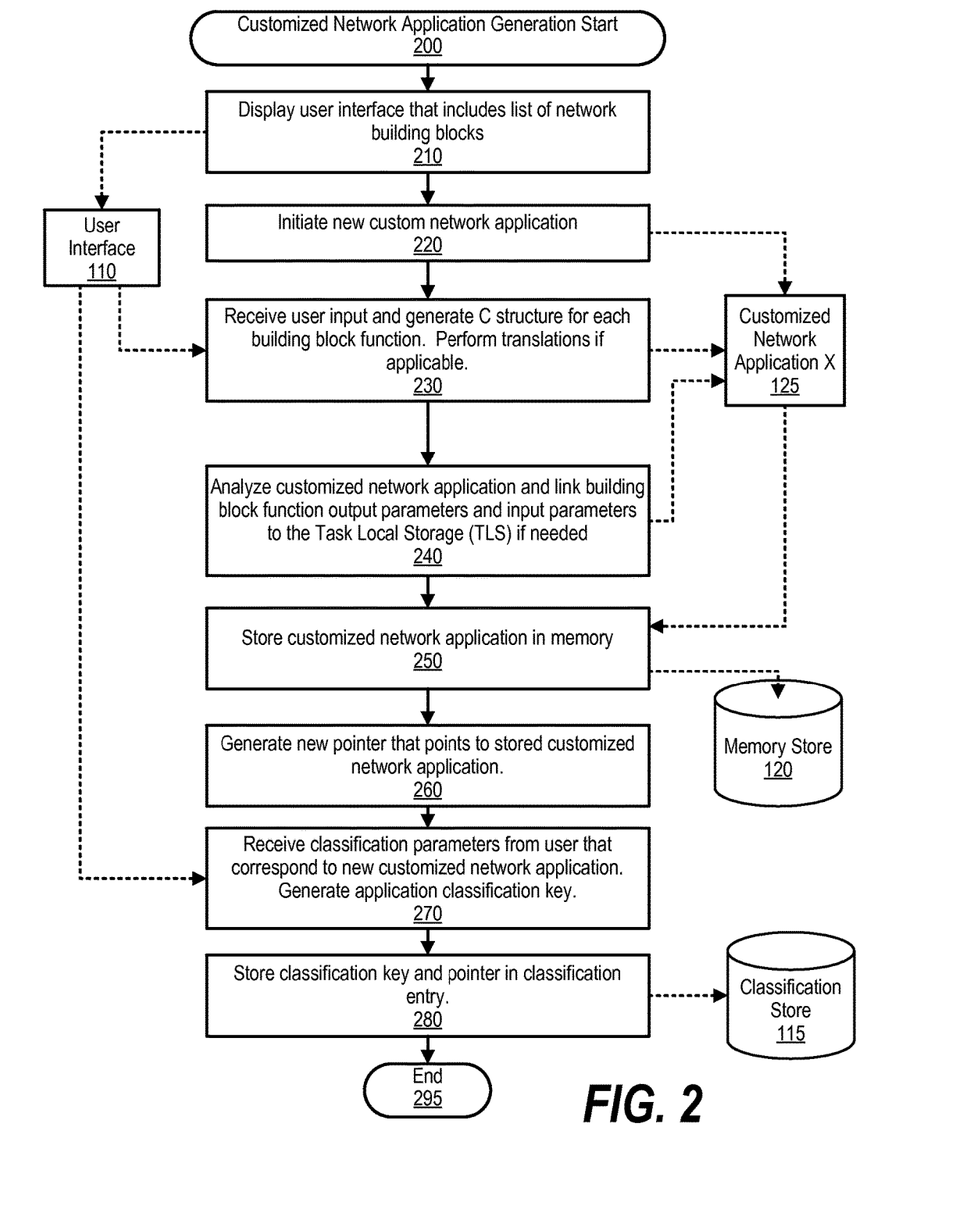
FIG. 2 is a flowchart depicting one example of a network flow framework generating a customized network application.

FIG. 2 is a flowchart depicting one example of a network flow framework generating a customized network application. FIG. 2 processing commences at 200 whereupon, at 210, the process displays user interface 110, which enables a user to provide information as discussed herein to generate a customized network application. In one embodiment, as discussed earlier, user interface 110 may include graphical depictions of building block functions, such as those shown in FIG. 3. In this embodiment, the user may link the building block functions to create a customized network application, such as that shown in FIG. 4. In another embodiment, a user inputs pseudo-code that describes the relationships between various building block functions, such as the pseudo-code shown in FIG. 5.

At 220, the process initiates a new customized network application, such as customized network application X 125. At 230, the process receives user input via user interface 110, which may consist of pseudo-code, GUI building block function links, or other types of building block function connection information that instructs the process to select/combine network application building block functions. In turn, the process populates the customized network application with C structures based upon the user input. See FIG. 6 and corresponding text for further details.

At 240, the process analyzes the customized network application, or received user input, to determine which building block functions will pass parameters or results to other building block functions through a task local storage (TLS). In one embodiment, the process makes this determination based upon user provided instructions. For example, a user may specify a table search building block function to pass results to a route entry determination building block function.

When the process determines which building block functions will pass parameters or results through the TLS, the process fills the corresponding building block function's C structure output command parameters with corresponding TLS memory addresses, and fills the other building block function's C structure input command parameters with the corresponding TLS memory addresses. For example, the process may assign TLS addresses 0x100-0x200 to the application and connect output to input parameters in the commands within this address range. See FIG. 6 and corresponding text for further details. After filling the necessary parameters in the C structures, the process stores customized network application X 125 at 250 at a specific memory location in memory store 120.

Figure 7:
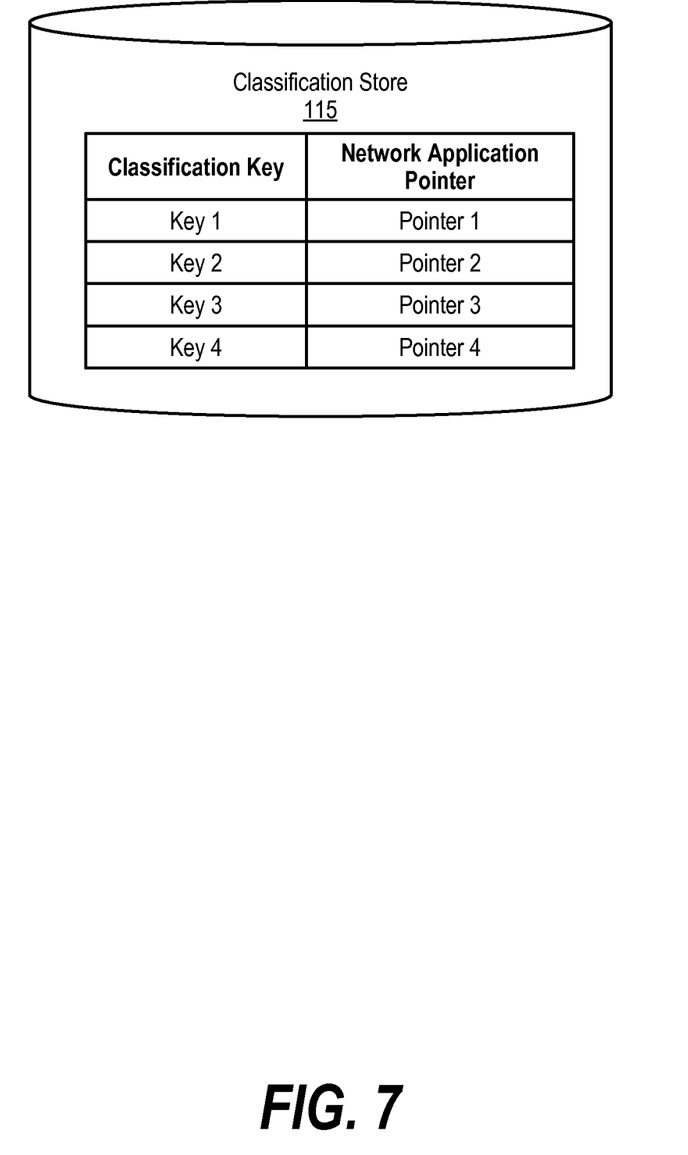
FIG. 7 is a diagram depicting one example of a table that includes application classification parameters and network application pointers stored in classification entries.

At 260, the process generates a new customized network application pointer that points to the specific memory location of customized network application X 125. At 270, the process receives application classification parameters from the user that correspond to new customized network application, such as source/destination MAC addresses. In turn, the process generates an application classification key such as by concatenating the application classification parameters to form the application classification key. At 280, the process stores the application classification key and the network application pointer in a classification entry in classification store 115. FIG. 7 shows an example of a table that includes classification entries. FIG. 2 processing thereafter ends at 295.

FIG. 3 is a diagram depicting one example of a graphical user interface that shows building block functions for which to create a network application. In one embodiment, user interface 110 is graphical user interface 300 that shows building block functions 310, 320, 330, 340, 350, 360, and 370. The user, in turn, may create a network flow by linking the building block functions and creating a customized network application, such as that shown in FIG. 4. Graphical user interface 300 may contain more or less images that represent building block functions than what is shown in FIG. 3.

Network flow framework 100 receives the linking information and creates a customized network application that captures the various user-specified links. For example, a user may provide a link that identifies a subsequent block to be called after a current block is finished processing, such as linking an increment counter block to a PBR search block. In another example, a user may provide information that links output parameters of "block A" to input parameters of "block B," such as linking a PBR search block output to an input of an increment counter block.

FIG. 4 is a diagram depicting one example of a user using a GUI to link building block functions and create a customized network application. As discussed earlier, a user may use GUI building block function links to connect various building block functions and create a customized network application. Network flow framework 100 analyzes the connections between building block functions and generates a customized network application that includes C structures and function calls based upon the links between the building block functions.

Figure 5:
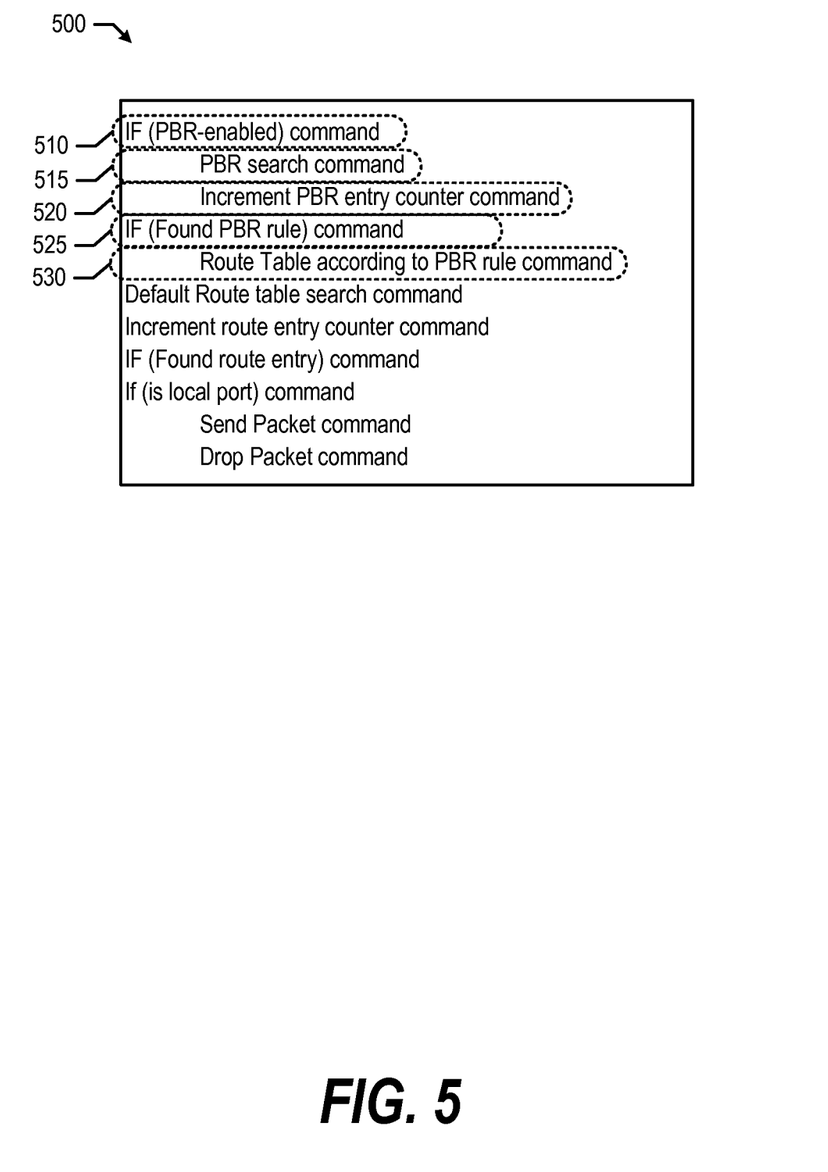
FIG. 5 is a diagram depicting one example of pseudo-code provided by a user to generate a customized network application.

FIG. 5 is a diagram depicting one example of pseudo-code provided by a user to generate a customized network application. Pseudo-code 500 includes code lines that each calls different building block functions. Similar to the graphical representation shown in FIG. 4, pseudo-code 500's line 510 calls IF PBR Enabled building block function 220. If policy based routing is enabled, then line 515 calls PBR Search building block function 260, and line 520 calls Increment Counter building block function 230. Line 525 then calls IF PBR Rule Found building block function 240. If a PBR rule is found, then line 530 calls Route Table Search building block function 270, and so on.

Figure 6:
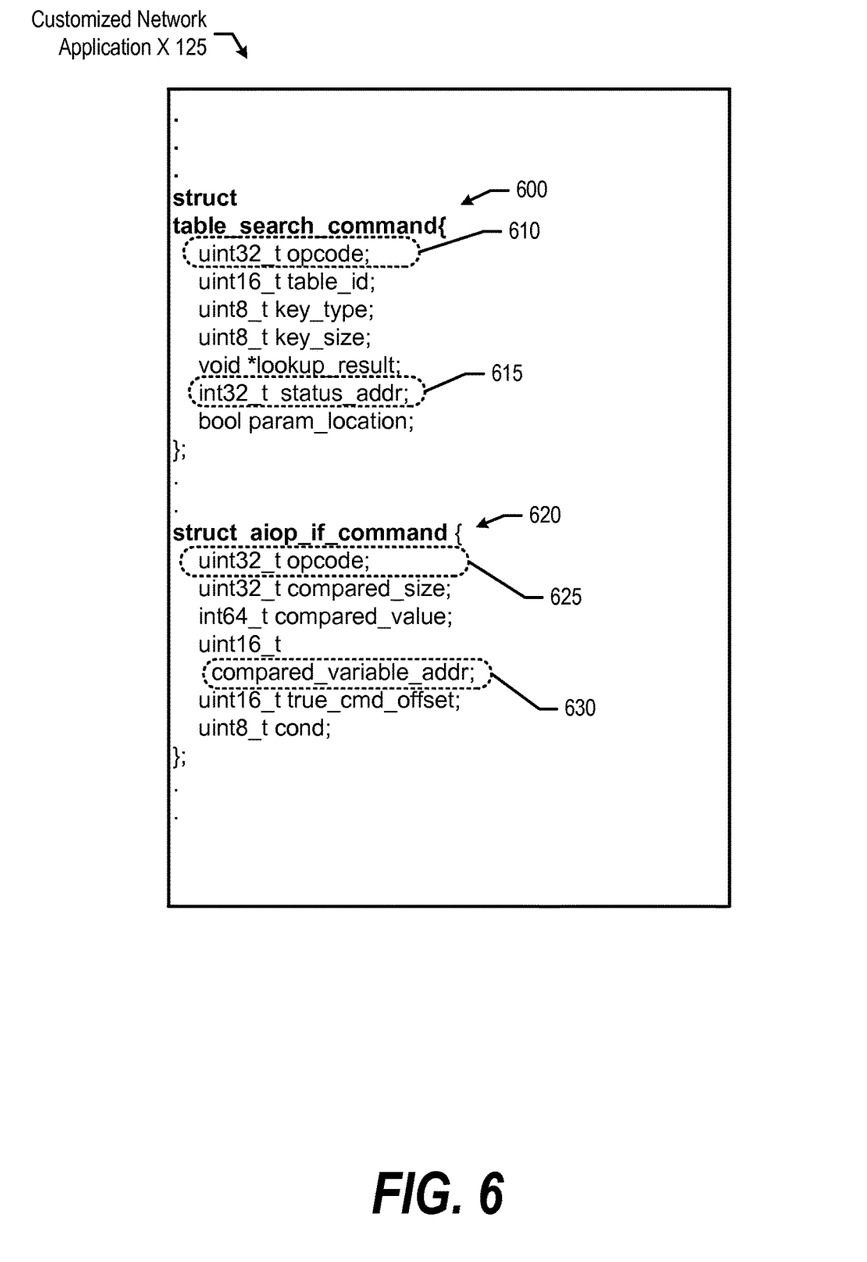
FIG. 6 is a is a diagram depicting one example of a customized network application that includes C structures that pass parameters into and out of a task local storage (TLS)

FIG. 6 is a is a diagram depicting one example of a customized network application that includes C structures that pass parameters into and out of a task local storage (TLS). As discussed earlier, when the network flow framework detects that building block functions should be configured to pass parameters to each other through a task local storage, the network flow framework links output parameter addresses of one building block function with input parameter addresses of a subsequent building block function.

Customized network application X 125 includes C structures 600 and 620, each corresponding to two different building block functions. C structure 600 includes lines 610 and 615. Line 610 includes an opcode corresponding to a table search command building block function. Line 615 saves the status results from the table search command building block function in a memory address:

*(uint32_t*) (table_search_command.status_addr)=status.

In turn, C structure 620 includes line 625 that calls an AIOP IF command building block function, which reads the status from the same address according to the address from line 630:

Status=*(uint32_t*)(if_command_compared_variable_addr).

FIG. 7 is a diagram depicting one example of a table that includes application classification parameters and network application pointers stored in classification entries. When network flow framework 100 creates a customized network application, network flow framework 100 creates a classification entry in classification store 115. For each classification entry, network flow framework 100 stores a network application pointer that points to the corresponding customized network application as well as an application classification key that was generated from application classification parameters such as MAC addresses and IP address discussed herein.

During runtime, packet classifier 145 matches a packet classification key of an ingress data packet to one of the application classification keys. When a match is determined, packet classifier 145 loads the corresponding network application pointer from the matched classification entry into the header of the ingress data packet. In turn, the customized network application pointer stays in the header throughout runtime flow 170, which allows the ingress data packet to be processed independently from other ingress data packets.

Figure 8:
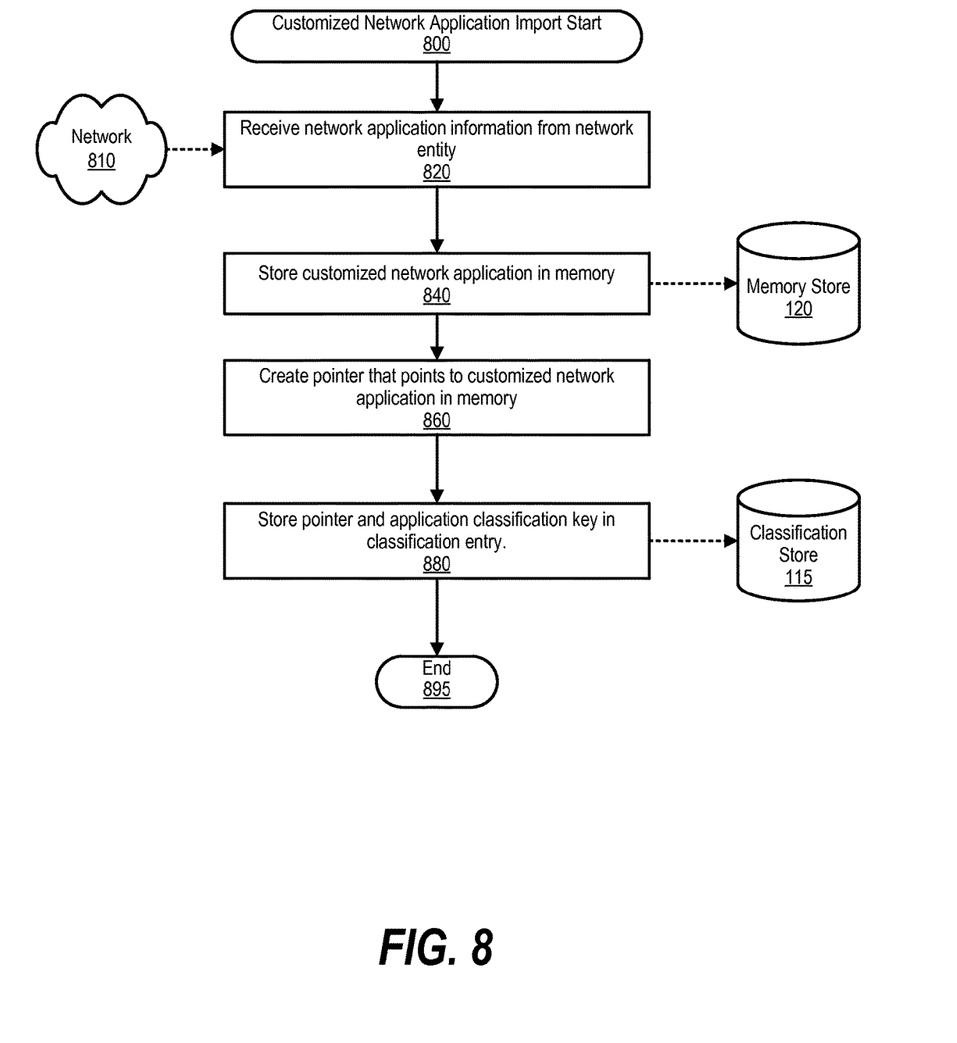
FIG. 8 is a flowchart depicting one example of a network flow framework receiving a customized network application from a network entity over a network.

FIG. 8 is a flowchart depicting one example of a network flow framework receiving a customized network application from a network entity over a network. In one embodiment, the network flow framework may receive customized network applications from other entities over a network because the customized network applications are independent from a machine's architecture. As a result, a network flow framework may receive and utilize customized network applications that were originally created on different types of network flow frameworks.

FIG. 8 processing commences at 800 whereupon, at 820, the process receives network application information from a network entity over network 810. The network application information may include an application classification key and a customized network application that includes C structures and function calls that call building block functions stored in the network application framework. At 840, the process stores the customized network application in a specific memory location in memory store 120. At 860, the process creates a pointer that points to the specific memory location and, at 880, the process stores the pointer and the application classification key in a classification entry in classification store 115. FIG. 8 processing thereafter ends at 895.

Figure 9:
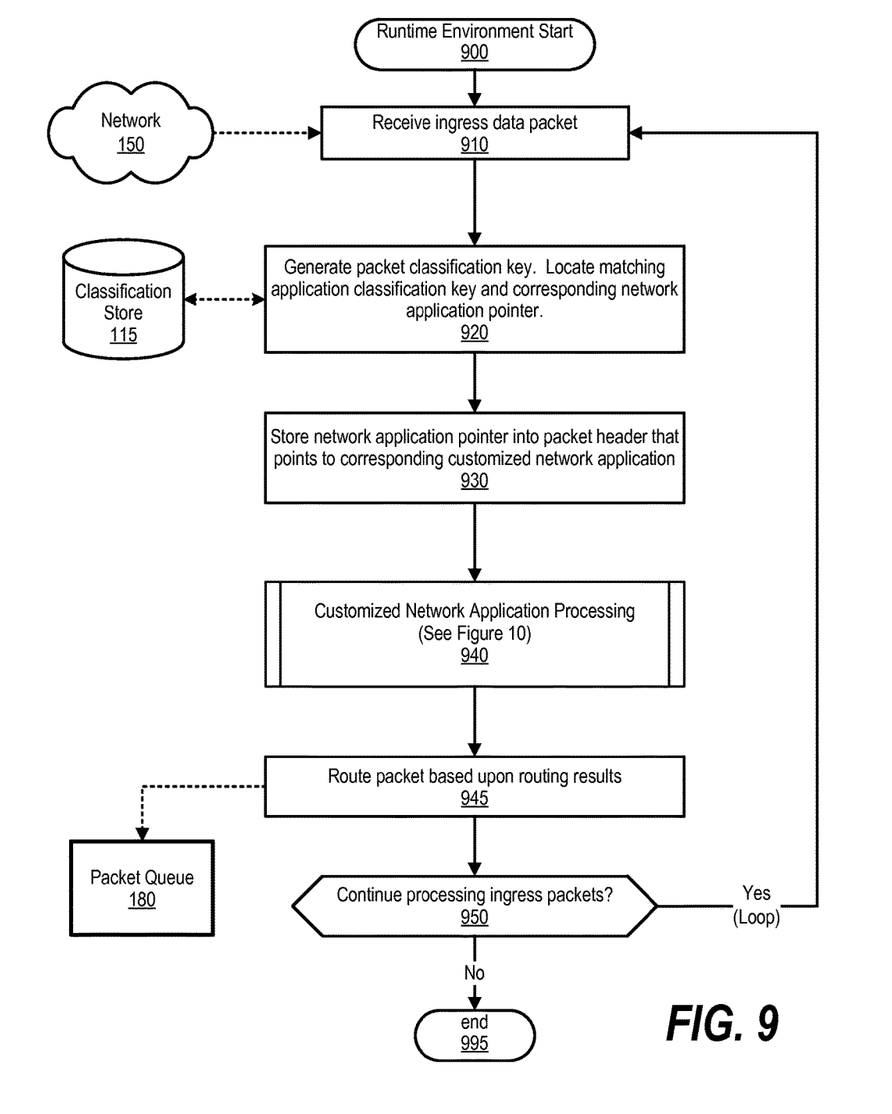
FIG. 9 is a flowchart depicting one example of a network flow framework that dynamically classifies ingress data packets and processes the ingress data packets using a customized network application corresponding to the packet's classification.

FIG. 9 is a flowchart depicting one example of a network flow framework that dynamically classifies ingress data packets and processes the ingress data packets using a customized network application corresponding to the packet's classification.

Processing commences at 900 whereupon, at 910, the process receives an ingress data packet over network 150. At 920, the process generates a packet classification key from packet classification parameters such as the ingress data packets source/destination MAC address or source/destination IP address. The process matches the packet classification key to one of the application classification keys in classification store 115.

At 930, the process retrieves a network application pointer from the classification entry that includes the matching application classification key and stores the network application pointer into the ingress packet's header, such as network application pointer 160 shown in FIG. 1. The network application pointer stays in the packet header throughout processing to maintain independence from other packets.

At predefined process 940, the process loads a customized network application from a memory location specified by the network application pointer, which invokes various building block functions to generate routing results. See FIG. 10 and corresponding text for processing details. At 945, the process loads the packet into packet queue 180 or drops the packet based upon the routing results, such as whether the process did or did not locate a table entry that matches the ingress data packet.

The process determines as to whether to continue processing ingress data packets (decision 950). If the process should continue processing ingress data packets, then decision 950 branches to the 'yes' branch, which loops back to 910 to receive and process more ingress data packets. This looping continues until the process terminates, such as when the network flow framework is taken offline for maintenance, at which point decision 950 branches to the 'no' branch exiting the loop. FIG. 9 processing thereafter ends at 995.

Figure 10:
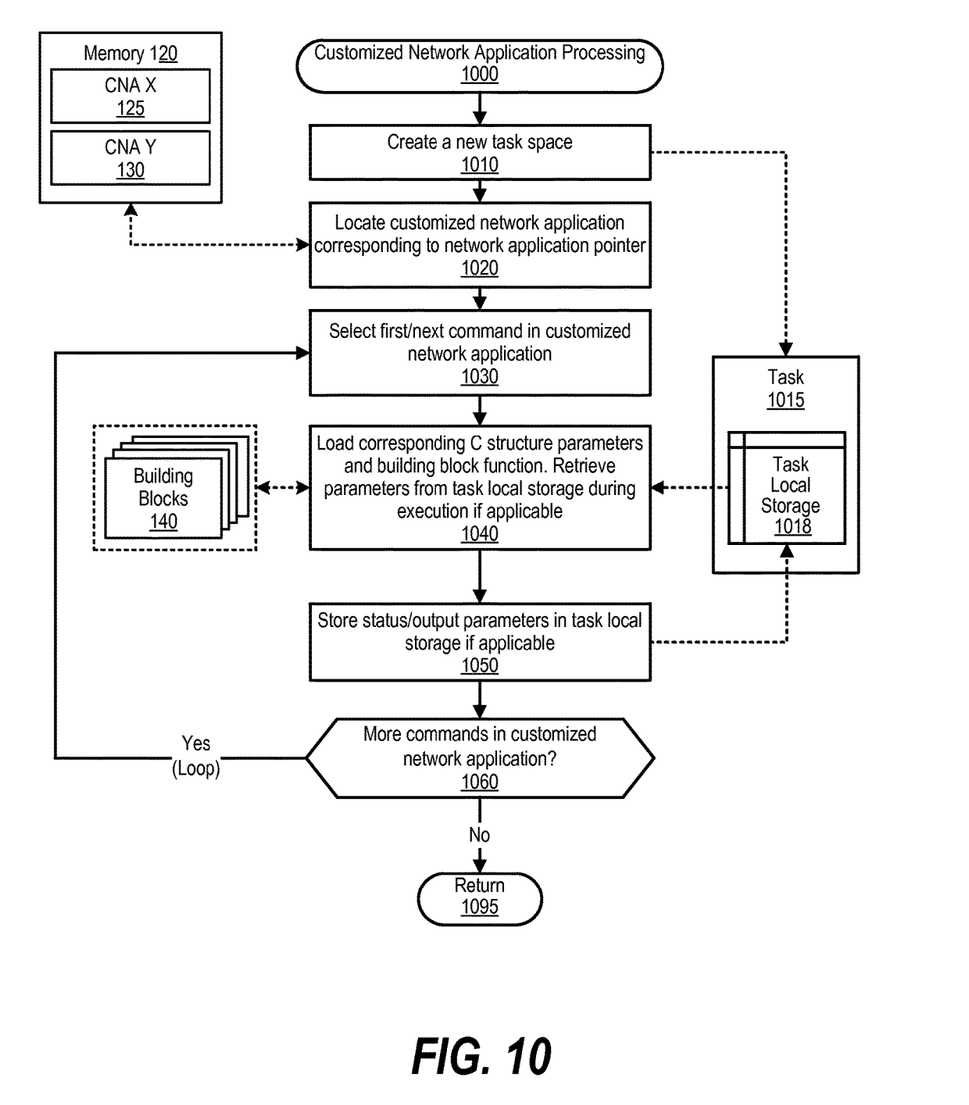
FIG. 10 is a flowchart depicting one example of a network flow framework utilizing a selected customized network application to process an ingress data packet.

FIG. 10 is a flowchart depicting one example of a network flow framework utilizing a selected customized network application to process an ingress data packet. In one embodiment, the steps shown in FIG. 10 are executed by application wrapper 125, which may include looping switch-case code that loads C structures from the selected customized network application and calls the corresponding building block function functions based upon the opcodes included in the C structures.

Processing commences at 1000 whereupon, at 1010, the process creates a new task space 1015 in memory, such as in the system's DDR-SDRAM. At 1020, the process locates the customized network application corresponding to the ingress data packet's network application pointer and, at 1030, the process selects the first command in the customized network application, which is typically the first C structure's opcode.

At 1040, the process loads the corresponding C structure parameters and corresponding building block function that corresponds to the opcode. During the building block function execution, the process retrieves parameters from task local storage 1018 if configured to do so by the C structure parameters, such as retrieving an input value for an IF command. At 1050, the process stores status/output parameters from the executed building block function in task local storage 1018 for subsequent building block functions to utilize if specified by the corresponding C structure.

The process determines whether more commands exist in the customized network application (decision 1060). If more commands exist, such as more C structures, then decision 1060 branches to the 'yes' branch, which loops back to process the next command. This looping continues until the customized network application completes, at which point decision 1060 branches to the 'no' branch exiting the loop. FIG. 10 processing thereafter returns to the calling routine (see FIG. 9) at 1095.

According to one embodiment of the present invention, a network flow framework locates a customized network application based upon a network application pointer located in a header of an ingress data packet. The network flow framework executes the customized network application, which includes executing one or more building block functions called by the customized network application to process the ingress data packet. The network flow framework routes the ingress data packet based upon routing results generated from executing the customized network application.

According to another embodiment of the present invention, the network flow framework generates a packet classification key based upon a set of packet parameters corresponding to the ingress data packet. The network flow framework matches the packet classification key to an application classification key and retrieves a corresponding network application pointer. In turn, the network flow framework stores the network application pointer in the header of the ingress data packet.

According to another embodiment of the present invention, the network flow framework generates C structures based upon user input that links one or more of the building block functions and groups the C structures to form the customized network application. The network flow framework stores the customized network application in a memory address and creates the network application pointer that points to the memory address, which is stored in a classification entry.

According to another embodiment of the present invention, the network flow framework generates an application classification key based upon a set of application parameters corresponding to the customized network application and stores the application classification key in the classification entry.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Figure 11:
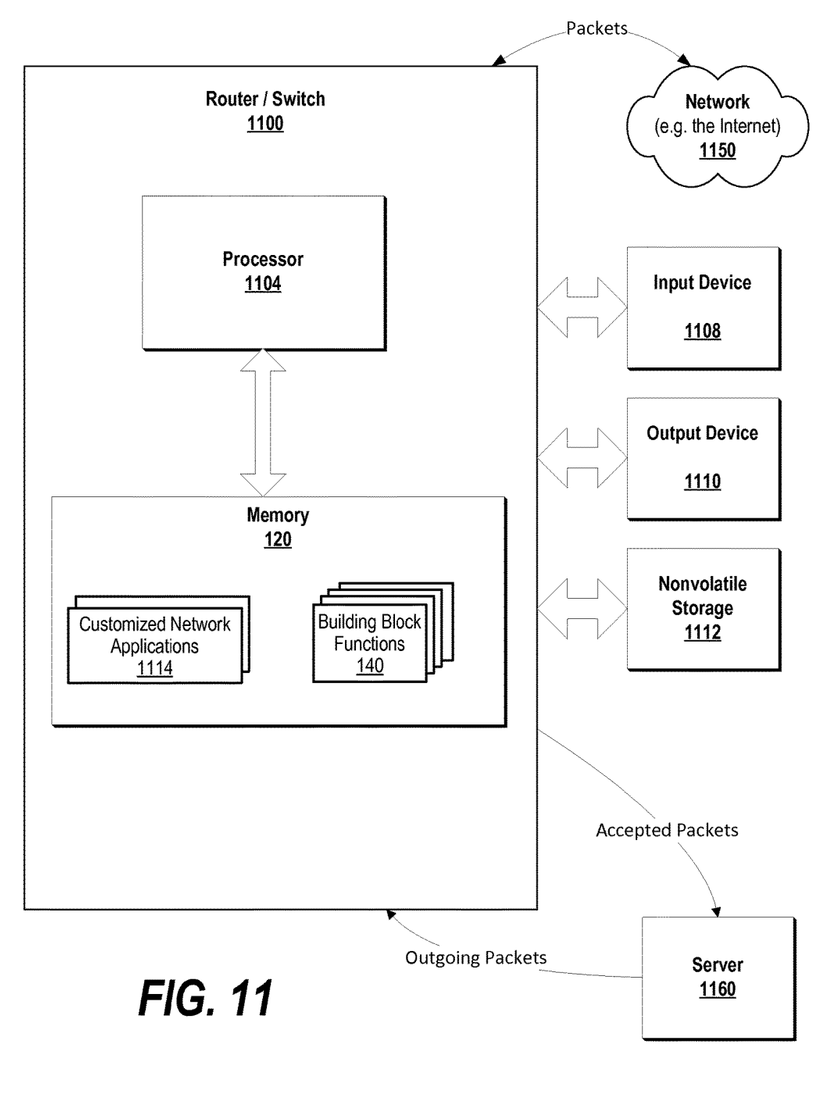
FIG. 11 illustrates a simplified example of a data processing system capable of performing the processing operations described herein.

FIG. 11 illustrates router/switch 1100, which is a simplified example of a data processing system capable of performing the data processing operations described herein. Router/switch 1100 is a specialized data processing system that includes a processor, or processors 1104, and memory 1106. Custom network applications 1114, which includes customized network applications 125 and 130 shown in FIG. 1, and building block functions 140 are shown to be resident in memory 120 and are accessed by a runtime environment executing in processor 1104.

An input device 1108 and an output device 1110 are connected to router/switch 1100 and represent a wide range of varying I/O devices such as disk drives, keyboards, modems, network adapters, printers and displays. Nonvolatile storage device 1112, includes a disk drive, nonvolatile memory, optical drive, or any other nonvolatile storage device, is shown connected to router/switch 1100. In one aspect, router/switch 1100 is used to filter incoming packets received from network 1150, such as the Internet. Packets that are accepted after being processed by processor 1104 are passed to server 1160 for processing. Router/switch 1100 may also be used to receive outgoing packets from server 1160 and transmit them to a device interconnected to the router via network 1150.

While the router described in FIG. 11 is capable of executing the invention described herein, this device is simply one example of a router. Those skilled in the art will appreciate that many other router designs are capable of performing the invention described herein.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by data processing system that comprises a memory and one or more processors, the method comprising:
   locating a network application, from a plurality of network applications, based upon a network application pointer located in a header of an ingress data packet;
   executing the network application by at least one of the processors, wherein the execution of the network application further comprises performing one or more building block functions called by the network application to process the ingress data packet and generate one or more routing results; and
   routing, by at least one of the processors, the ingress data packet based upon the one or more routing results.

2. The method of claim 1 wherein, prior to the locating of the network application, the method further comprises:
   generating a packet classification key based upon a set of packet parameters corresponding to the ingress data packet;
   matching the packet classification key to one of a plurality of application classification keys stored in one of a plurality of classification entries;
   retrieving the network application pointer from one of the plurality classification entries that store the matched application classification key; and
   storing the network application pointer in the header of the ingress data packet.

3. The method of claim 2 further comprising:
   receiving a different ingress data packet;
   generating a different packet classification key based upon a set of different packet parameters corresponding to the different ingress data packet;
   matching the different packet classification key to a different one of the plurality of application classification keys;
   retrieving a different network application pointer from one of the plurality classification entries that store the different application classification key; and
   storing the different network application pointer in a different header of the different ingress data packet.

4. The method of claim 3 further comprising:
   locating a different network application from the plurality of network applications based upon the different network application pointer;
   executing the different network application, wherein the execution of the different network application further comprises performing one or more different building block functions called by the different network application to process the different ingress data packet and generate one or more different routing results; and
   routing the different ingress data packet based upon the one or more different routing results.

5. The method of claim 4 wherein the data processing system concurrently executes the network application and the different network application.

6. The method of claim 1 wherein, prior to the locating of the network application, the method further comprises:
   generating one or more programming structures based upon user input that links one or more of the building block functions;
   grouping the one or more programming structures, resulting in the network application;
   storing the network application in a memory address;

creating the network application pointer that points to the memory address; and
storing the network application pointer in a classification entry.

7. The method of claim 6 further comprising:
generating an application classification key based upon a set of application parameters corresponding to the network application; and
storing the application classification key in the classification entry.

8. The method of claim 6 wherein the user input is selected from the group consisting of pseudo code, one or more GUI building block function links, and building block connection information.

9. The method of claim 6 wherein each of the one or more programming structures comprises an opcode corresponding to one of the one or more building block functions.

10. The method of claim 1 wherein the executing of the network application further comprises:
executing a first one of the one or more building block functions, wherein the execution of the first building block function stores one or more output results into a task local storage area; and
executing a second one of the one or more building block functions, wherein the execution of the second building block function retrieves the one or more output results from the task local storage area.

11. A method implemented by a data processing system, the method comprising:
generating a network application that comprises a plurality of programming structures, wherein each of the plurality of programming structures comprises an opcode that calls one of a plurality of building block functions;
generating a classification entry that includes a network application pointer and an application classification key, wherein the network application pointer points to an address location of the network application; and
executing the network application to process an ingress data packet in response to matching the application classification key to a packet classification key corresponding to the ingress data packet.

12. The method of claim 11 wherein the executing of the network application further comprises:
executing a first one of the plurality building block functions, wherein the execution of the first building block function stores one or more output results into a task local storage area; and
executing a second one of the plurality of building block functions, wherein the execution of the second building block function retrieves the one or more output results from the task local storage area.

13. The method of claim 11 further comprising:
generating the application classification key based upon one or more application classification parameters corresponding to the network application, wherein at least one of the one or more application classification parameters is selected from the group consisting of a destination MAC address, a source MAC address, a destination IP address, and a source IP address.

14. The method of claim 11 wherein the execution of the network application generates one or more routing results, the method further comprising:
routing the ingress data packet based upon the one or more routing results, wherein the routing is selected from the group consisting of enqueuing the ingress data packet and dropping the ingress data packet.

15. A data processing system comprising:
one or more processors;
a memory coupled to at least one of the processors; and
a set of computer program instructions stored in the memory and executed by at least one of the processors in order to perform actions of:
locating a network application, from a plurality of network applications, based upon a network application pointer located in a header of an ingress data packet;
executing the network application, wherein the execution of the network application further comprises performing one or more building block functions called by the network application to process the ingress data packet and generate one or more routing results; and
routing the ingress data packet based upon the one or more routing results.

16. The data processing system of claim 15 wherein, prior to the locating of the network application, at least one of the one or more processors perform additional actions comprising:
generating a packet classification key based upon analyzing a set of packet parameters corresponding to the ingress data packet;
matching the packet classification key to one of a plurality of application classification keys stored in one of a plurality of classification entries;
retrieving the network application pointer from one of the plurality classification entries that store the matched application classification key; and
storing the network application pointer in the header of the ingress data packet.

17. The data processing system of claim 16 wherein at least one of the one or more processors perform additional actions comprising:
receiving a different ingress data packet;
generating a different packet classification key based upon a set of different packet parameters corresponding to the different ingress data packet;
matching the different packet classification key to a different one of the plurality of application classification keys;
retrieving a different network application pointer from one of the plurality classification entries that store the different application classification key; and
storing the different network application pointer in a different header of the different ingress data packet.

18. The data processing system of claim 17 wherein at least one of the one or more processors perform additional actions comprising:
locating a different network application from the plurality of network applications based upon the different network application pointer;
executing the different network application, wherein the execution of the different network application further comprises:
executing one or more different building block functions called by the different network application to process the different ingress data packet and generate one or more different routing results; and
routing the different ingress data packet based upon the one or more different routing results.

19. The data processing system of claim 15 wherein, prior to the locating of the network application, at least one of the one or more processors perform additional actions comprising:

generating one or more programming structures based upon user input that links one or more of the building block functions;

grouping the one or more programming structures, resulting in the network application;

storing the network application in a memory address;

creating the network application pointer that points to the memory address; and storing the network application pointer in a classification entry.

20. The data processing system of claim 19 wherein at least one of the one or more processors perform additional actions comprising:

generating an application classification key based upon a set of application parameters corresponding to the network application; and storing the application classification key in the classification entry.

* * * * *